(12) United States Patent
Stehle

(10) Patent No.: US 11,704,670 B2
(45) Date of Patent: Jul. 18, 2023

(54) BANKNOTE DEPOSIT MACHINE

(71) Applicant: Gerrit Stehle, Frankfurt am Main (DE)

(72) Inventor: Gerrit Stehle, Frankfurt am Main (DE)

( * ) Notice: Subject to any disclaimer, the term of this patent is extended or adjusted under 35 U.S.C. 154(b) by 217 days.

(21) Appl. No.: 16/762,785

(22) PCT Filed: Nov. 8, 2018

(86) PCT No.: PCT/EP2018/080625
§ 371 (c)(1),
(2) Date: May 8, 2020

(87) PCT Pub. No.: WO2019/092111
PCT Pub. Date: May 16, 2019

(65) Prior Publication Data
US 2020/0349578 A1   Nov. 5, 2020

(30) Foreign Application Priority Data

Nov. 9, 2017 (DE) ...................... 10 2017 126 318.7
Nov. 1, 2018 (DE) ...................... 10 2018 127 346.0

(51) Int. Cl.
*G06Q 20/40* (2012.01)
*G07D 11/225* (2019.01)
(Continued)

(52) U.S. Cl.
CPC ..... *G06Q 20/4016* (2013.01); *G06Q 20/1085* (2013.01); *G06Q 20/20* (2013.01);
(Continued)

(58) Field of Classification Search
None
See application file for complete search history.

(56) References Cited

U.S. PATENT DOCUMENTS 6,573,983 B1 * 6/2003 Laskowski ............. G07D 7/121
356/394
8,146,802 B1 * 4/2012 Ramachandran .... G06Q 20/105
705/40

(Continued)

FOREIGN PATENT DOCUMENTS

DE          19824435 A1   12/1999
WO       2011131276 A1   10/2011

OTHER PUBLICATIONS

"Ubaid Ur Rahman et al., Android-Based Verification System for Bankotes, Journal of Imaging Nov. 20, 2017, 7-10" (Year: 2017).*
(Continued)

*Primary Examiner* — Kito R Robinson
*Assistant Examiner* — Toan Duc Bui
(74) *Attorney, Agent, or Firm* — Lerner David LLP

(57) ABSTRACT

A banknote deposit machine is able to receive banknotes, preferably so as to make a payment, wherein the banknote machine is permanently connected via a data link to a (cloud) storage system, or is designed to establish a temporary data link with the (cloud) storage system. Banknote data, such as image data or serial number data, etc., specifically of banknotes which are considered stolen or which were handed over as a result of a crime, for example as a ransom, are stored in the (cloud) storage system. Whenever the banknote deposit machine receives a banknote whose identification appears suspicious, for example because the banknote has a serial number that is stored in the (cloud) storage system, feedback is sent to the operator of the banknote machine and/or the payment transaction is terminated and/or an appropriate institution or authority, for example the police or a security service, is automatically informed.

16 Claims, 1 Drawing Sheet

(51) Int. Cl.
*G07D 11/30* (2019.01)
*G06Q 20/10* (2012.01)
*G06Q 20/20* (2012.01)
*G07F 19/00* (2006.01)

(52) U.S. Cl.
CPC ........... *G07D 11/225* (2019.01); *G07D 11/30* (2019.01); *G07F 19/203* (2013.01); *G07F 19/207* (2013.01); *G07F 19/211* (2013.01)

(56) References Cited

U.S. PATENT DOCUMENTS

| | | | |
|---|---|---|---|
| 2002/0076093 A1* | 6/2002 | Palmer | G06Q 20/042 |
| | | | 382/137 |
| 2003/0059098 A1 | 3/2003 | Jones et al. | |
| 2004/0232217 A1* | 11/2004 | Graef | G07D 11/10 |
| | | | 235/379 |
| 2009/0145959 A1* | 6/2009 | VanKirk | G06Q 20/042 |
| | | | 235/379 |
| 2012/0243056 A1* | 9/2012 | Yamaguchi | G07D 11/32 |
| | | | 382/137 |
| 2013/0026228 A1 | 1/2013 | Stoeckli et al. | |
| 2013/0043106 A1* | 2/2013 | Iizuka | B65H 29/58 |
| | | | 198/570 |
| 2016/0210805 A1* | 7/2016 | Kim | G06K 7/10009 |
| 2017/0352015 A1* | 12/2017 | Xu | G06V 40/113 |

OTHER PUBLICATIONS

International Search Report for PCT/EP2018/080625 dated Feb. 21, 2019; 4 pages.

\* cited by examiner

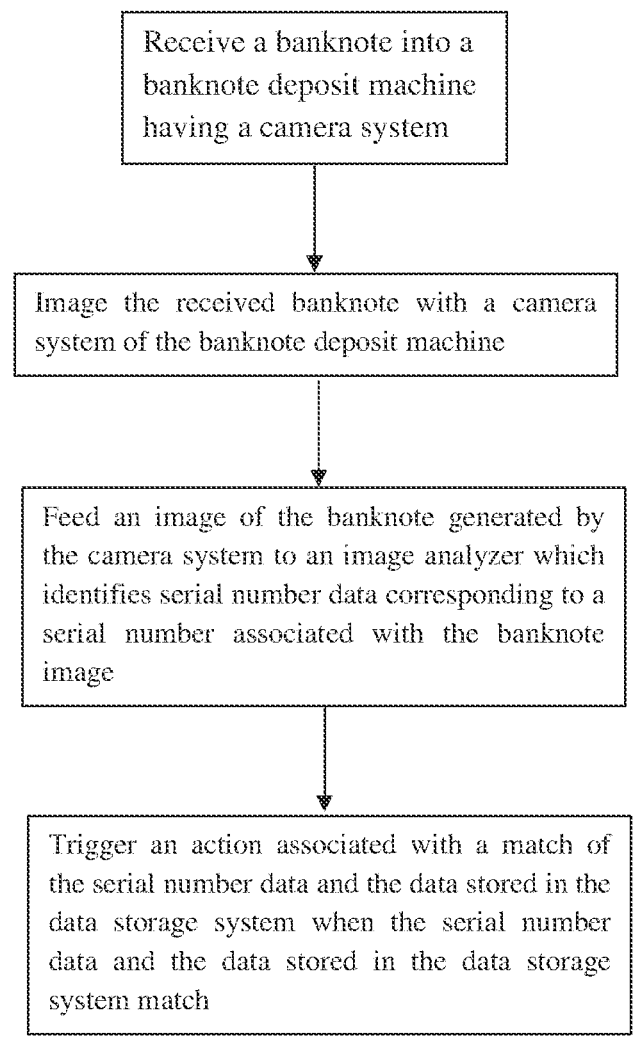

BANKNOTE DEPOSIT MACHINE

CROSS REFERENCE TO RELATED APPLICATIONS

The present application is a national phase entry under 35 U.S.C. § 371 of International Application No. PCT/EP2018/080625, filed on Nov. 8, 2018, which claims the benefit of German Patent Application Nos. 10 2017 126 318.7, filed on Nov. 9, 2017, and 10 2018 127 346.0, filed on Nov. 1, 2018, the disclosures of which are hereby incorporated herein by reference.

TECHNICAL FIELD

The invention relates to a banknote deposit machine and to a method of identifying banknotes.

BACKGROUND OF THE INVENTION

Banknote deposit machines of various kinds are known. Such machines are able to accept banknotes and to manage a deposit transaction in that respect.

Such banknote deposit machines are routinely deployed in canteens, for example, where money is loaded onto canteen cards with which food can be paid for, or banknote deposit machines are also used so that certain tickets can also be paid for in cash in the form of banknotes, and it is also known that, at vulnerable points-of-sale, such as filling stations, a person who wants to pay the fuel bill in cash will hand the banknote to the cashier, who then puts the note into the banknote deposit machine, and if change must be dispensed, the change due is automatically dispensed.

It is also known, finally, that appropriate banknote deposit machines are meanwhile provided in supermarkets, where the customer can then pay the bill for his or her shopping basket in cash, and in that case also, the banknote is automatically inserted or drawn into a banknote deposit machine, and any change due is automatically dispensed.

It is also known, furthermore, that banknotes can be checked for authenticity in machines. Such machines are generally deployed where counterfeit money is more frequently used for payment.

However, the problem is that only forged banknotes can be detected with such machines, but they cannot detect whether the money with which the customer is paying was previously stolen.

BRIEF SUMMARY OF THE INVENTION

The object of the invention is to enable money depositing transactions to be faster and more efficient than hitherto and also, in particular, to prevent money depositing transactions in which payment can be made with stolen money or with money obtained through crime.

This object is achieved according to the invention with a banknote deposit machine according to claim 1. Advantageous embodiments are described in the dependent claims.

The invention is based on the idea that it is very easy now to photograph money. A person who possesses cash can do this himself, for example by means of his smartphone, for example by taking a photograph of the cash by means of a smartphone.

However, it would also be conceivable for someone receiving money to put it into a machine where the money is photographed, with the respective image data files then being sent to the respective customer at his desired storage address.

It is also conceivable, for example, that at a cash machine where someone is withdrawing money, for example at an automated teller machine (ATM), the separate banknotes are photographed before they are dispensed and that the photographs are sent to a money memory associated with the customer. These image data can remain there for a period of time specified beforehand by the ATM customer, who is able to specify that period by entering it at the ATM.

However, it is also possible, without further ado, that the rightful owner of the money photographs the banknotes himself and sends the data to storage allocated to him.

If the money is then stolen, the rightful owner of the money is able to specify more precisely the money belonging to him, for example by stating the respective serial numbers, which can be derived from the image data of the photographed banknotes.

In cases where large sums of money are paid, for example in kidnappings, it would be easy to photograph all the money being paid and to store the respective image data.

In the invention, the banknote deposit machine is connected semi-permanently online to a data storage system, for example to a (cloud) data storage system. If there is no permanent connection, it is possible to establish such a connection temporarily, for example within a deposit transaction.

If the banknote deposit machine itself has a recording device, for example a camera, the money inserted into the banknote deposit machine is likewise photographed (or scanned), and respective code data, for example serial numbers, can be identified from the image data, and these serial numbers are compared with respective serial numbers in the storage system.

If the serial number of the inserted banknote is a serial number that matches a serial number of stolen money, for example, the deposit transaction can then be discontinued and the deposited money can be impounded because ultimately it does not belong at all to the person depositing it.

If, for example, money is also deposited whose serial number has been verifiably destroyed, it is also possible to establish that money is being deposited that cannot be legal tender and that may also be counterfeit, without the counterfeit having been noticed to date by other means.

According to the invention, the picture obtained by the camera system is analyzed in every deposit transaction, and the acquired image data, for example the serial numbers, are matched to determine whether these are stored in the database as "valid" or as "invalid". "Invalid" can mean that the money was obtained through crime, has been reported as stolen, or cannot actually exist anymore because the banknote in question has already been destroyed along with its serial number.

As image analysis can be done extremely quickly and is also very fast, comparison of the image data with the cloud storage system does not delay the depositing process, either, because the entire transaction can be carried out within a few seconds.

With the method according to the invention, certain money flows can also be monitored much better than hitherto, because it is possible with the method to determine very precisely when which banknotes were deposited.

For example, if €500 notes are withdrawn from a foreign bank, for example a bank in France, and a correspondingly large amount of money is deposited in Germany using those €500 notes, it will be easy to establish where the deposited money last appeared, and from that observation it has been very easy until now to draw conclusions, in and during the deposit transaction, about irregularities, criminal activities, etc.

By means of the invention, it is also possible, therefore, to make visible the withdrawal of a large sum of cash in country A and the depositing of the money in country B.

Since the banknotes themselves are uniquely identifiable, but do not have any privacy rights themselves, the method according to the invention does not involve any data protection problem, either, because the personal data of the depositor/owner of the money are not involved at the same time.

BRIEF DESCRIPTION OF THE DRAWING

FIG. 1 is a flow chart of process for identifying a banknote.

DETAILED DESCRIPTION

The invention shall now be described in greater detail with reference to an embodiment.

A banknote is inserted into a banknote deposit machine (the insertion technology is known per se).

A camera system which photographs the inserted banknote, preferably from both sides, is accommodated in the banknote deposit machine.

The picture taken by the camera is fed to a image data analyzer, for example an analyzer that analyzes the pictures taken by the camera and identifies the serial number of the banknote.

The data obtained from the image data analyzer are compared with data in a storage system. A cloud storage system is preferably used.

All the serial numbers of all the banknotes in circulation of a particular currency, for example Euro, might be stored in said storage system.

After the serial numbers have been analyzed in the image data analyzer, it is thus possible to compare the serial numbers with the stored serial numbers.

If the serial number obtained from the image data analyzer is also known in the image store to be "in order", the banknote deposit machine is given feedback to that effect and the deposit transaction is continued.

If the serial number obtained by the image data analyzer is known to be "not in order", feedback to that effect is given and the deposit transaction is discontinued and the money is preferably retained in the banknote deposit machine and a message, such as "Caution, there is a problem here" or "Banknote is stolen" or the like, preferably appears on a display device of the banknote deposit machine (visible for the cashier at least).

It is also possible to forward such a message to a nearest investigating authority, for example the police.

Money verified as stolen can thus be returned to the rightful owner by means of the invention.

If the money was obtained by some other crime, for example a case of extortion in which a ransom was paid, the ransom can likewise be returned to the rightful user.

It no longer makes any sense at all for blackmailers to extort cash, therefore, because all the banknotes can be easily identified and are stored in the system, which means de facto that they cannot be used as a means of payment.

If someone withdraws cash themselves from a cash machine, it is also quite possible that the cash dispensing machine itself takes photos of the money beforehand and has them analyzed, so that stolen money, or money involved in crime, is not dispensed in the first place. However, private individuals can also make good use the invention by taking photographs of banknotes they obtain, for example, by means of a smartphone, and by sending the respective image data to the image data analyzer or the storage system, for example by WhatsApp, eMail or the like, and the analyzer for its part can then check whether the money received is in order or not and can thus send a message to that effect back to the respective smartphone immediately.

If someone pays at a filling station with stolen money, then the moment the cash deposit machine at the filling station establishes that stolen money is being or has been used to pay, steps are also taken to ensure that the video cameras installed at that location, for example the filling station, store their pictures permanently, so that the identity of the payer and/or his car can be inferred as well as possible and recorded.

A banknote dispensing machine according to the invention can also be configured in such a way that it has a special input tray. The money being deposited is placed in this input tray if it turns out when checking the deposited money that the banknote is of "criminal origin", and this is also recorded by the serial number being marked accordingly in the storage system. Thus, if the banknote machine receives a banknote that appears, on the basis of information (e.g. a marking) in the store, to be of dubious origin, for example because it has been registered as stolen, forged, or criminal in some other way, the inserted banknote is associated with the input tray and rerouted, so that inadvertent dispensing of such a banknote as change can be prevented.

This then allows the investigating authorities to examine the banknote, secured accordingly in the input tray, in detail at a later point in time, for example with regard to fingerprints, traces of DNA, etc.

As already mentioned, the invention is suitable not only for a banknote machine that can receive banknotes, but also for banknote machines by means of which money can be withdrawn using a bank card.

This cash withdrawal and dispensing process is well known. A person inserts his bank card into an input slot of the cash machine and the user then specifies the amount of money he wants to withdraw, and the cash is dispensed to the customer after verification by entering the PIN (personal identification number), which normally consists of four single digits.

In that case, a variant of the invention would then allow the banknote dispensing machine to be provided with the depositing option, for example by providing a button for that purpose, or a corresponding touchscreen function or the like, which allows the customer to expressly instruct the cash machine to also take photographs of the money that the customer receives, or to record the serial numbers.

For the customer, this has the advantage that after withdrawing the cash, if he is assaulted and robbed a short time later, he is able in any case to prove which money was actually stolen from him.

If the customer uses the "banknote photography/security" function when withdrawing the money, the respective (dispensed) banknotes are photographed, or the respective serial numbers of the dispensed banknotes are recorded, and this unique banknote information is then associated with the user's bank account number and stored.

It would also be possible to list those serial numbers on the user's bank statement.

However, if, as mentioned above, the user is assaulted shortly after withdrawing the cash, or the money is stolen, he can specify exactly to the investigating authorities the serial numbers of the money that was stolen from him.

These serial numbers can now be set/marked to "stolen money" in the cloud storage system or on a respective server/storage system, with the consequence that whenever these banknotes from the robbery are used at a later date, for example are deposited, they can also be clearly identified during the deposit transaction.

For the bank operating the cash machine, the variant of the invention described above, as applied to a cash machine of the ATM (automated teller machine) type, also provides the opportunity and the advantage of operating a proprietary insurance model for the money that is dispensed.

If the customer wants a photograph of the money he has withdrawn, he could thus take out cash insurance simultaneously by using the function "photograph banknote or record serial number", and is he was then robbed, he could be refunded the money from the insurance company, and it would then be possible for the insurance companies or the investigating authorities to set the stolen money to "criminal" in a respective storage system, so that it is also detected when the money re-enters circulation, for example when it is fed into in the aforementioned banknote machines capable of receiving banknotes.

By means of the invention, it would thus be possible to insure cash for a particular period of time at relatively low cost.

A particular period of time means in this case that the insurance cover can only apply for a certain period after the money has been withdrawn. A typical such period would be, for example, one week, two weeks, one month, etc., or a period that is defined by the user himself.

The time period may be as long as the statistical average duration that money remains with the user/consumer.

The variant, described above, of a banknote dispensing machine which is able to dispense banknotes thus has means for capturing image data and/or serial number data from banknotes that are dispensed, wherein means are also provided for associating the data of the dispensed banknotes, for example their image data and/or serial number data, with the customer data, for example account data, account cards, names, customers, etc., when a particular amount of money is withdrawn, and for storing the data of the withdrawn and dispensed money along with the customer data.

The invention claimed is:

1. A banknote deposit machine configured to receive banknotes, wherein the banknote deposit machine is part of a point of sale (POS) system and has a permanent Internet connection to a data storage system and wherein banknote data associated with suspicious banknotes which are considered stolen or exchanged as part of or as a result of a crime, are stored in the data storage system, the banknote deposit machine comprising:
 a camera system or recording system configured for imaging and recording image data associated with one or both sides of a banknote received by the banknote deposit machine;
 an image analyzer configured for analyzing the recorded image data such that a serial number of the banknote is identified or another code on the banknote is identified; and
 a processing device configured for comparing the respective identified serial number or code to the banknote data stored in the data storage system,
 wherein whenever the banknote deposit machine receives a banknote identified as being one of the suspicious banknotes based on the banknote data, the banknote deposit machine is configured to
 (a) send feedback to an operator of the banknote machine associated with the identification of the banknote as being one of the suspicious banknotes; or
 (b) terminate the payment transaction.

2. The banknote deposit machine according to claim 1, wherein an image of the banknote imaged by the camera system is transferred to the processing device, the processing device being further configured for acquiring data from the banknote image or data that can be extracted from image processing of the banknote.

3. A method of identifying a banknote, comprising:
 receiving a banknote into a banknote deposit machine comprising a camera system;
 imaging the received banknote with a camera system of the banknote deposit machine, wherein an image of the banknote generated by the camera system is fed to an image analyzer which identifies serial number data corresponding to a serial number associated with the banknote image;
 comparing the serial number data identified by the image analyzer with corresponding data stored in a data storage system, the corresponding data having been stored in the data storage system prior to the imaging step; and
 triggering an action associated with a match of the serial number data and the corresponding data stored in the data storage system when the serial number data and the corresponding data stored in the data storage system match.

4. A filling station or supermarket having a banknote deposit machine according to claim 1.

5. A banknote deposit system comprising:
 the banknote deposit machine of claim 1; and
 a storage system in which image data and/or banknote images associated with each banknote received by the banknote deposit machine are stored.

6. The banknote deposit machine according to claim 1, further comprising an input tray to which suspicious banknotes are allocated and deposited.

7. A banknote dispensing machine configured to dispense banknotes, comprising:
 means for capturing image or serial number data from banknotes that are dispensed;
 means for associating the captured image or serial number data of the dispensed banknotes with customer data when a particular amount of money is withdrawn; and
 means for storing the captured image or serial number data of the withdrawn and dispensed money along with the customer data associated with the captured image or serial number data.

8. The banknote deposit machine according to claim 1, wherein the banknote data is image data or serial number data, and the data storage system is a cloud storage system or includes a server.

9. The banknote deposit machine according to claim 2, wherein the data that can be extracted from image processing of the banknote are code data that are deliberately applied to the banknote in addition to the serial number on the banknote such that the banknote can be identified again.

10. The method of identifying a banknote according to claim 3, wherein the image analyzer analyzes the data associated with the banknote image by identifying the serial number or another element of the banknote image.

11. The method of identifying a banknote according to claim 3, wherein the triggered action is the display of a message on the banknote deposit machine to the effect that depositing is not possible, "Caution, problematic banknote," or "Caution, money has already been used in a crime".

12. The banknote dispensing machine of claim 7, wherein the means for associating the captured image or serial number data of the dispensed banknotes with customer data when a particular amount of money is withdrawn is a camera system, wherein the customer data is an account number or account card number, and wherein the means for storing the captured image or serial number data of the withdrawn and dispensed money along with the customer data is an external data storage system.

13. The banknote deposit machine of claim 1, wherein the image analyzer is further configured to receive the image data from an external source, and wherein the banknote deposit machine is further configured to send feedback to the external source associated with the identification of the banknote as being one of the suspicious banknotes.

14. The banknote deposit machine of claim 13, wherein the external source is an electronic communication.

15. The method of claim 3, wherein the match identifies the banknote as being stolen or exchanged as part of or as a result of a crime.

16. The banknote deposit system of claim 5, wherein the storage system is configured to receive the image data from an external source, and wherein the banknote deposit machine is further configured to send feedback to the external source associated with the identification of the banknote as being one of the suspicious banknotes.

* * * * *